(12) United States Patent
Hovakimian

(10) Patent No.: US 7,956,487 B2
(45) Date of Patent: Jun. 7, 2011

(54) COMPOST UPDRAFT TOWER

(76) Inventor: Henry Hovakimian, Whittier, CA (US)

(*) Notice: Subject to any disclaimer, the term of this patent is extended or adjusted under 35 U.S.C. 154(b) by 53 days.

(21) Appl. No.: 12/619,613

(22) Filed: Nov. 16, 2009

(65) Prior Publication Data

US 2010/0219637 A1 Sep. 2, 2010

(51) Int. Cl.
*F03D 9/00* (2006.01)
*F16D 31/02* (2006.01)

(52) U.S. Cl. .................. 290/55; 290/44; 60/398
(58) Field of Classification Search ............ 290/43, 290/44, 54, 55; 60/398
See application file for complete search history.

(56) References Cited

U.S. PATENT DOCUMENTS

| | | | |
|---|---|---|---|
| 4,275,309 A | 6/1981 | Lucier | |
| 5,395,598 A | 3/1995 | Prueitt | |
| 6,626,636 B2 | 9/2003 | Bohn | |
| 6,647,717 B2 * | 11/2003 | Zaslavsky et al. | 60/398 |
| 7,757,490 B2 * | 7/2010 | Kenessey | 60/641.12 |
| 7,821,151 B2 * | 10/2010 | Le et al. | 290/55 |
| 2011/0021134 A1 * | 1/2011 | Zwern | 454/343 |

OTHER PUBLICATIONS

Robert Spencer, A New Generation of Commercial Disposers, Biocycle Magazine, Jul. 2008, vol. 49, No. 7, p. 27, The JG Press, Inc., Emmaus, PA, United States.

* cited by examiner

*Primary Examiner* — Nicholas Ponomarenko
(74) *Attorney, Agent, or Firm* — Razmig Messerian; Loza & Loza, LLP

(57) ABSTRACT

A system and method for converting heat energy released by compostable matter into electricity through the use of a compost updraft tower. A compost updraft tower comprises a collector region that contains compostable matter, one or more towers that rise up through the collector region, and one or more turbines. The air within the collector region is heated by the energy released during the composting process, and the heated air flows through the collector region toward the open first end of one or more of the towers. The heated air then rises up through one or more of the towers to the open second end of the tower. The heated air flowing through the system drives turbines that generate electricity. In one embodiment the roof of the collector region is transparent to allow solar radiation to penetrate the collector region and heat air within.

20 Claims, 13 Drawing Sheets

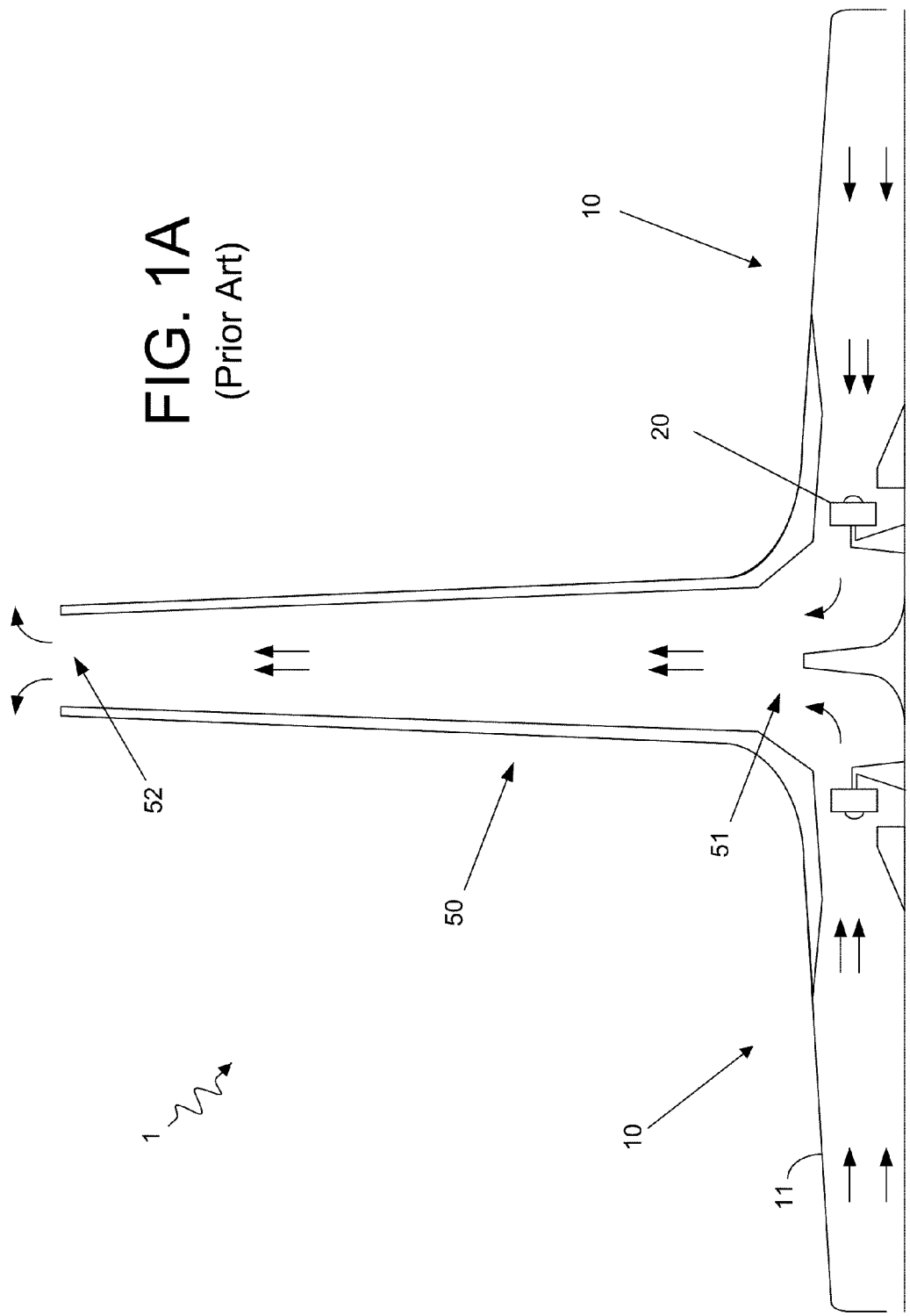

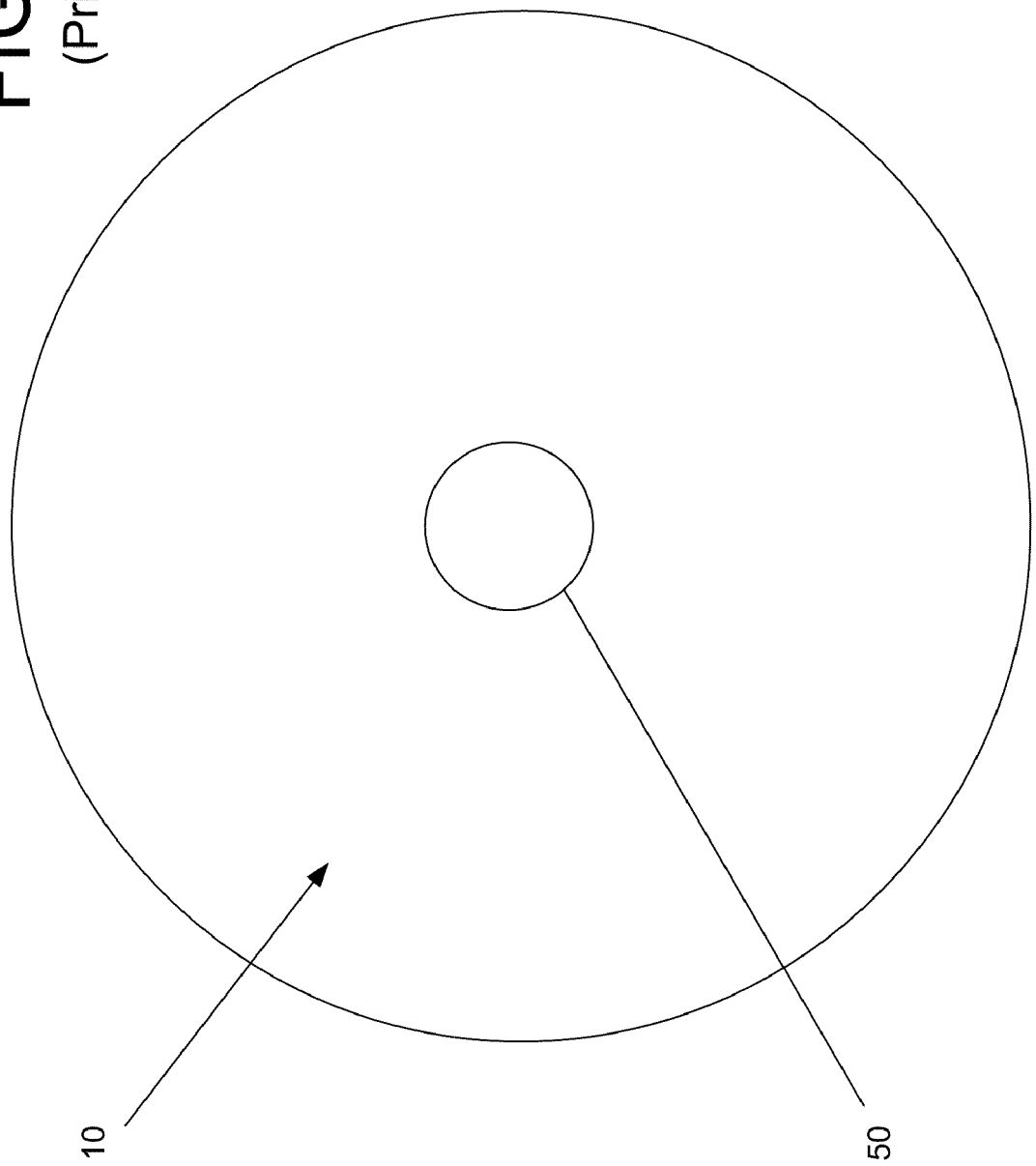

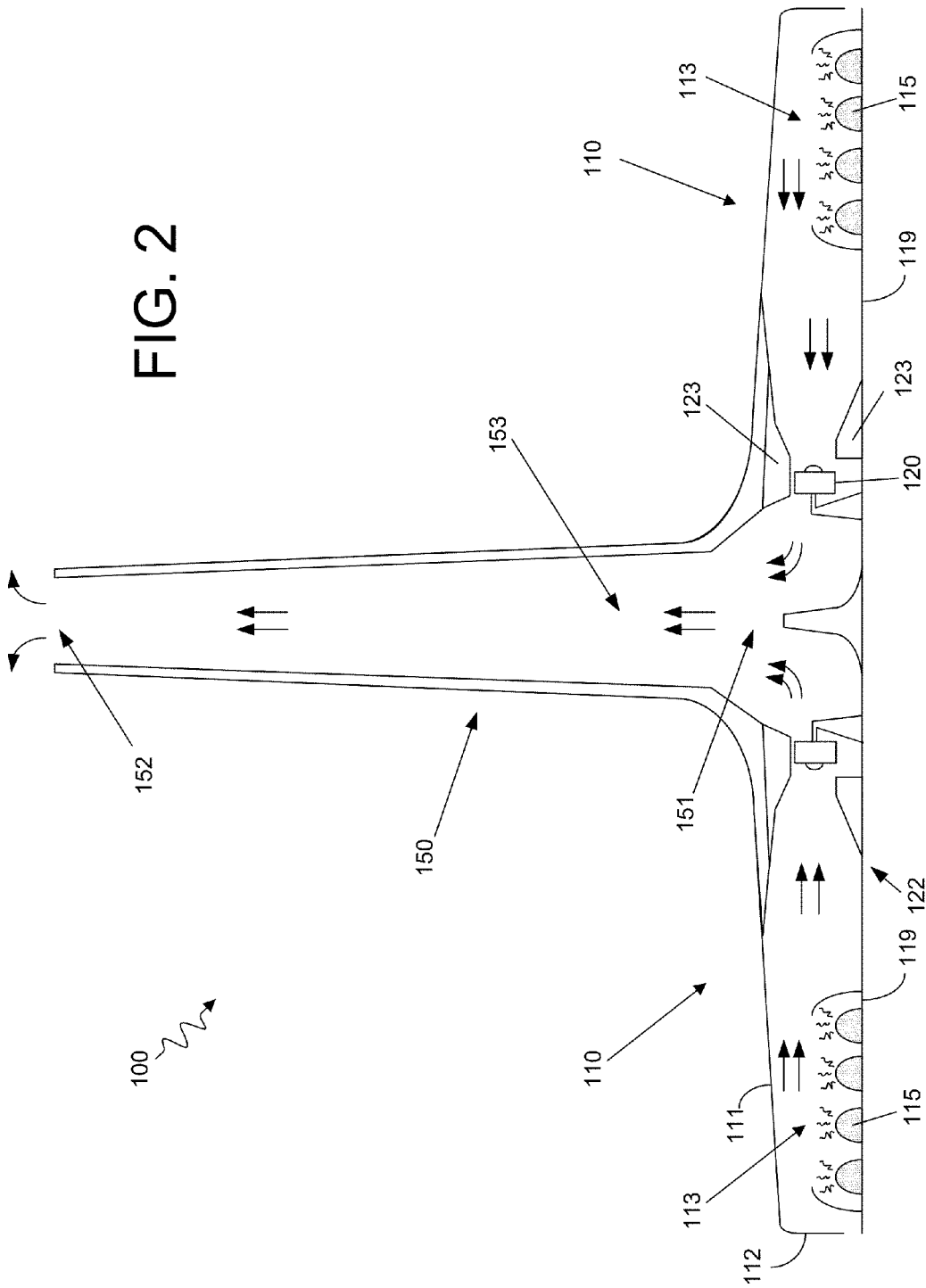

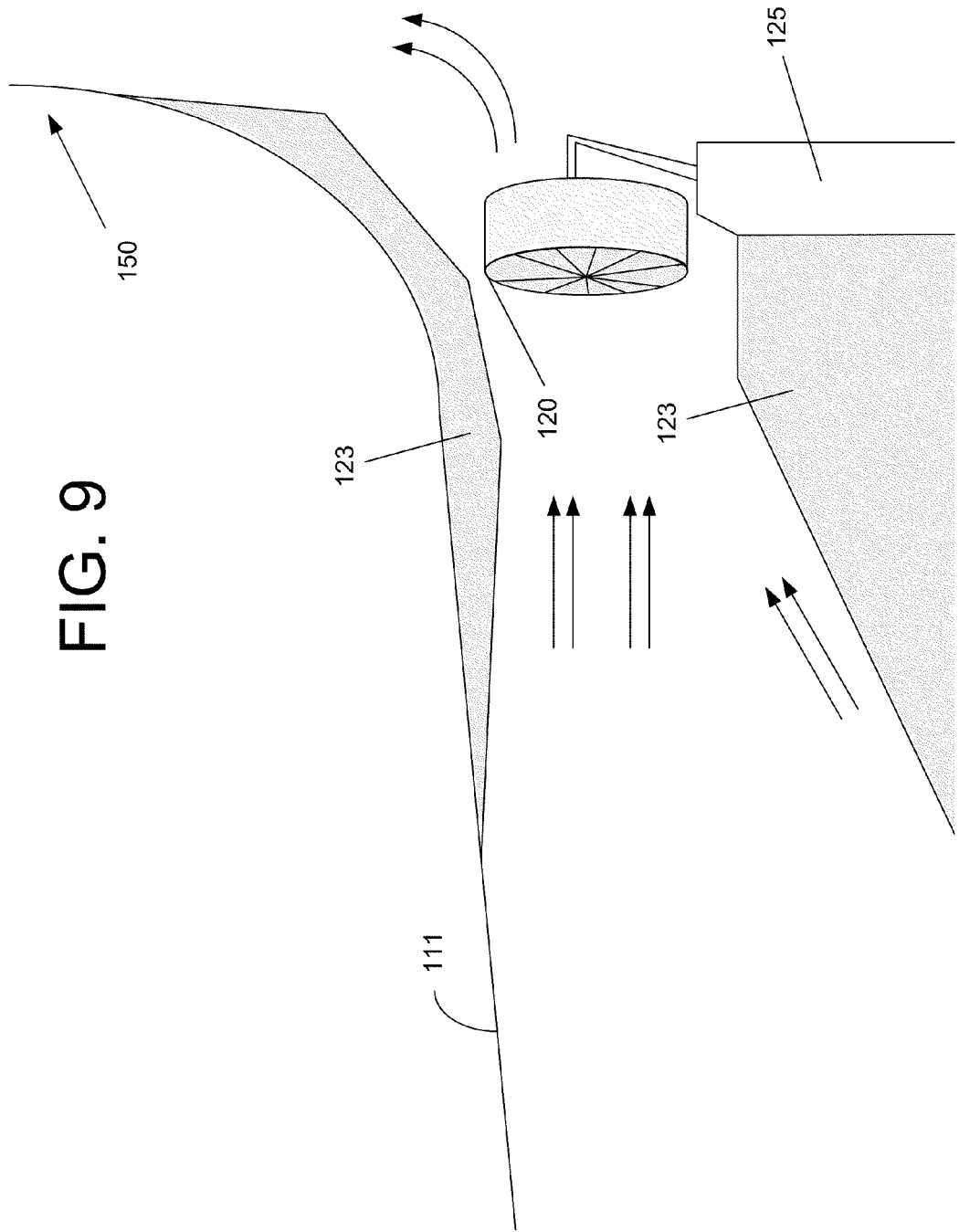

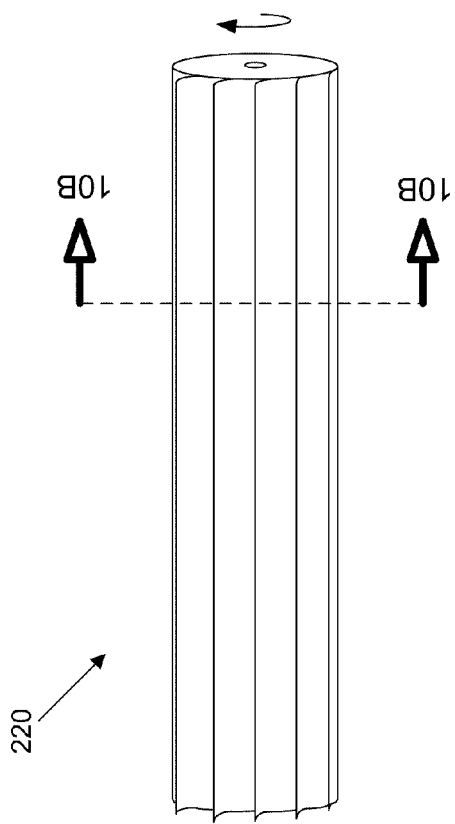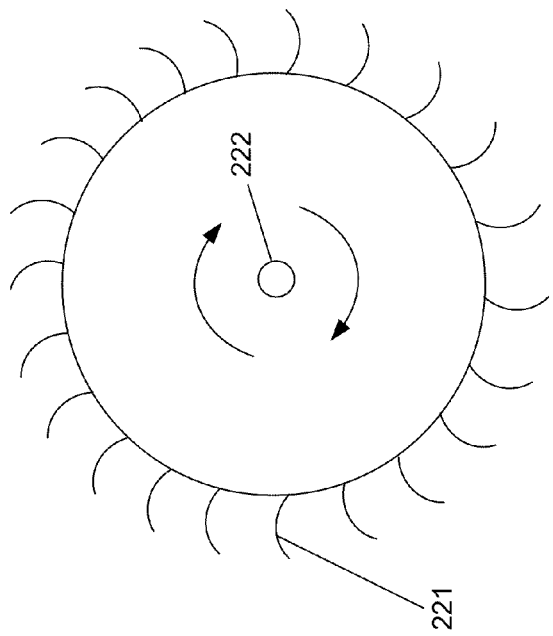

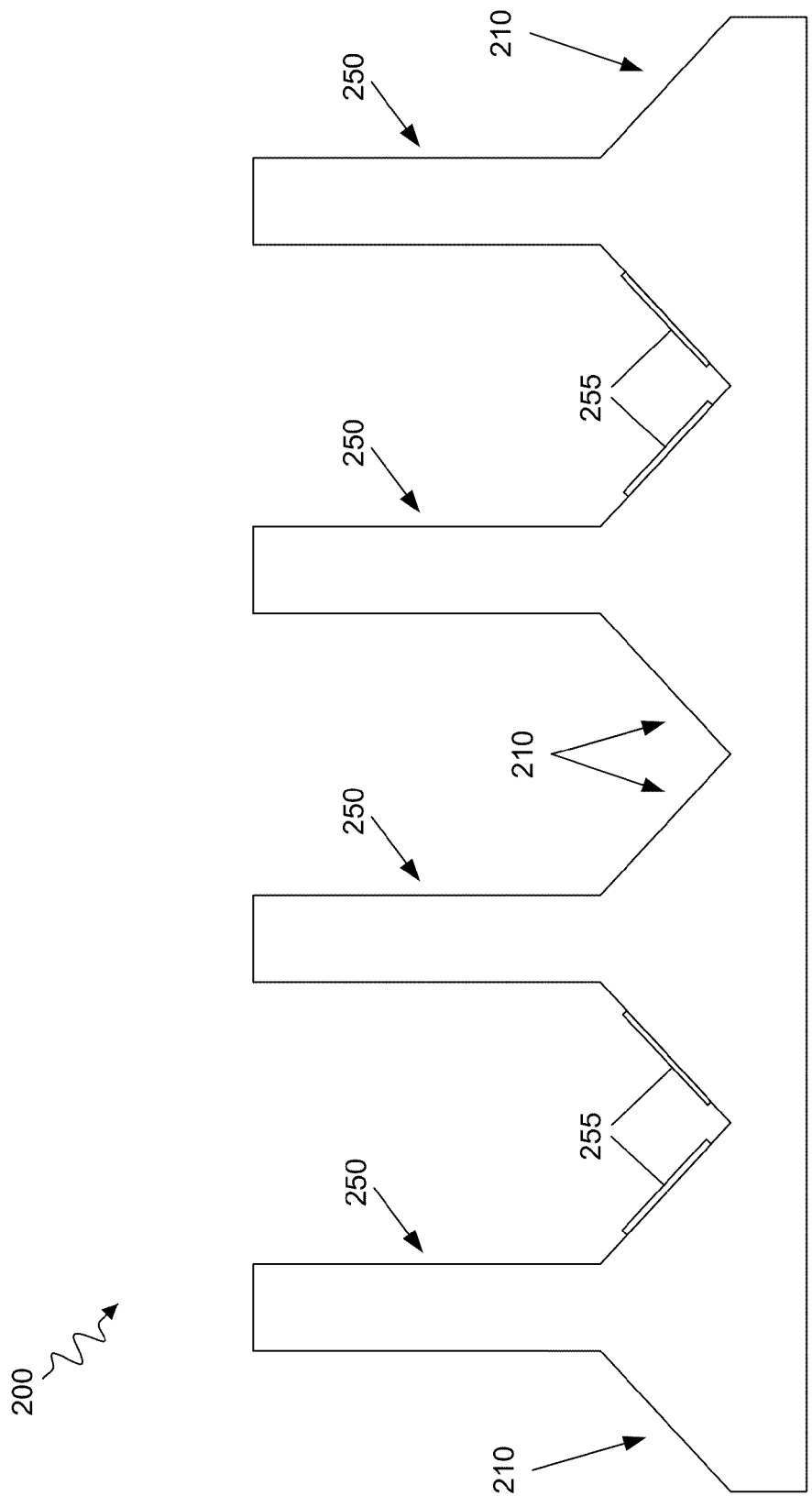

COMPOST UPDRAFT TOWER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application generally relates to power production and waste processing. More specifically, it relates to systems and methods for extracting heat energy from compostable material and converting this energy to electricity with the aid of an updraft tower.

2. Prior Art

One of the major problems facing the United States, indeed the world, is that of landfill pollution and inefficient waste processing. Every year the United States alone produces hundreds of millions of tons of municipal solid waste. Much of this waste is not recycled or composted. Of the portion that is composted, the heat energy generated by the composting process is not utilized. Additionally, locating potential landfill sites poses a significant problem as well. Landfills may contaminate ground water or cause other undesired environmental and aesthetic hazards.

Moreover, a chief concern facing the planet is finding alternative, renewable energy sources to replace conventional power plants that burn fossil fuels. Fossil fuel burning power plants, such as coal or oil burning plants, produce a host of unwanted greenhouses gases, which are believed to be a major contributor of global warming.

U.S. Pat. No. 4,275,309, the contents of which are incorporated herein by reference, describes a system for converting solar heat into electrical energy. The system has a collector region where large volumes of air are heated by the sun. This heated air then flows at a high speed towards the center of the structure due to a large pressure differential caused by a tall chimney-like tower that extends upward from the base of the structure. The high speed air drives a turbine that generates electricity. In the art, such systems are also known as a solar updraft towers. However, solar updraft towers in the prior art heat the air in their collector region with only solar energy.

Composting is the purposeful biodegradation of organic matter, such as yard and food waste, performed by microorganisms, such as bacteria, yeasts and fungi. The microorganisms consume the organic, carbon containing matter and break it down into its simplest parts. This produces a fiber-rich, carbon-containing humus with inorganic nutrients like nitrogen, phosphorus and potassium that can be used as fertilizer, potting soil, or for other important agricultural purposes. Through aerobic respiration microorganisms use oxygen and water to break the matter down. This process generates heat. Temperatures within compost piles can rise as high as 100 to 150 degrees Fahrenheit. Many commercial composting facilities do not harvest or otherwise use the ample heat energy released during the composting process, and allow it to dissipate into the surrounding environment.

Existing composting systems that do utilize the heat energy released from the composting process do not produce electricity. One such system described in the publication *BioCycle* August 2006, Vol. 47, No. 8, p. 38, uses Isobar superthermal conductor heat pipes to condense heated water vapor from the compost pile. The condensed vapor is then transferred along the pipes, providing energy to heat water in a large, insulated tank. The heated water can then provide radiant heat to a nearby structure, for example, a floorboard. However, such a system merely transfers the heat produced by the compost pile to provide heat to an adjacent structure. It does not provide a means to generate electricity from the heat energy released by the compost pile; electricity that can be used anywhere, in a myriad of ways.

It is an object of the present application to disclose a system and method that utilizes the heat energy released during the composting process to produce electricity using an updraft tower. It is also another object of the present application to disclose a system and method that utilizes the heat energy released during the composting process to supplement the solar heat energy generated within the collector region of a solar updraft tower to increase output power of the entire system. It is also an object of the present application to disclose a system and method that accomplishes these tasks while reducing landfill pollution by converting compostable waste into a valuable and useful end product (humus) that can be used in agriculture. It is also an object of the present application to disclose an alternative and renewable energy source that produces electricity in a clean, bio-friendly manner, and conserves the Earth's natural resources.

Additional objects, advantages and novel features will be set forth in the description which follows.

SUMMARY

The present application provides, among other things, a system and method for generating electricity comprising: a collector region configured to receive compostable matter and allow an airflow generated from heat energy released by the compostable matter to move through the collector region; a hollow tower rising up from the collector region, the tower having a first open end and a second open end, wherein the airflow moving through the collector region flows from the perimeter of the collector region to the first open end of the tower, and then rises through the tower to the second open end of the tower; and one or more turbines positioned in the path of the moving airflow to generate electricity.

In one embodiment, the collector region has a transparent roof permeable to solar radiation. The solar radiation heats the air within the collector region thereby contributing to the airflow within the collector region and increasing power output at the turbines. In another embodiment, a heated pipe assembly located beneath the compostable matter heats the compostable matter to promote the composting process. In yet another embodiment, a conveyor belt system facilitates automatic transportation of the compostable matter into, out of, and/or within the collector region.

In yet another embodiment, the collector region comprises a composting area, the composting area configured to receive and compost compostable matter, and wherein the composting area comprises a plurality of water sprinklers, a perimeter barrier, and a compost covering. In one embodiment, the collector region comprises air constrictors that focus the airflow at the one or more turbines. In yet another embodiment, the hollow tower comprises a plurality of hollow towers each rising up from the collector region, each of the plurality of towers having a first open end and a second open end. In one embodiment, the air constrictors form a port for each of the one or more turbines to further focus and direct the airflow to the turbines. In yet another embodiment, the one or more turbines comprise a plurality of turbines that surround the first open end of the tower. In another embodiment, the one or more turbines are located within the hollow tower.

Further aspects, features, embodiments, and advantages will become apparent from the detailed descriptions of the embodiments that follow.

BRIEF DESCRIPTION OF THE DRAWINGS

FIG. 1A shows a schematic, cross-sectional side view of a solar updraft tower from the prior art.

FIG. 1B shows a schematic, top view of a solar updraft tower from the prior art.

FIG. 2 shows a schematic, cross-sectional side view of an embodiment of the compost updraft tower.

FIG. 9 shows a schematic, cross-sectional side view of a portion of the base of the tower of a compost updraft tower.

FIGS. 10A and 10B show schematic views of an embodiment of a turbine located within a compost updraft tower.

FIG. 11 shows a schematic side view of an embodiment of a compost updraft tower system featuring a multi-tower structure.

DETAILED DESCRIPTION

Solar Updraft Tower

Figure 3:
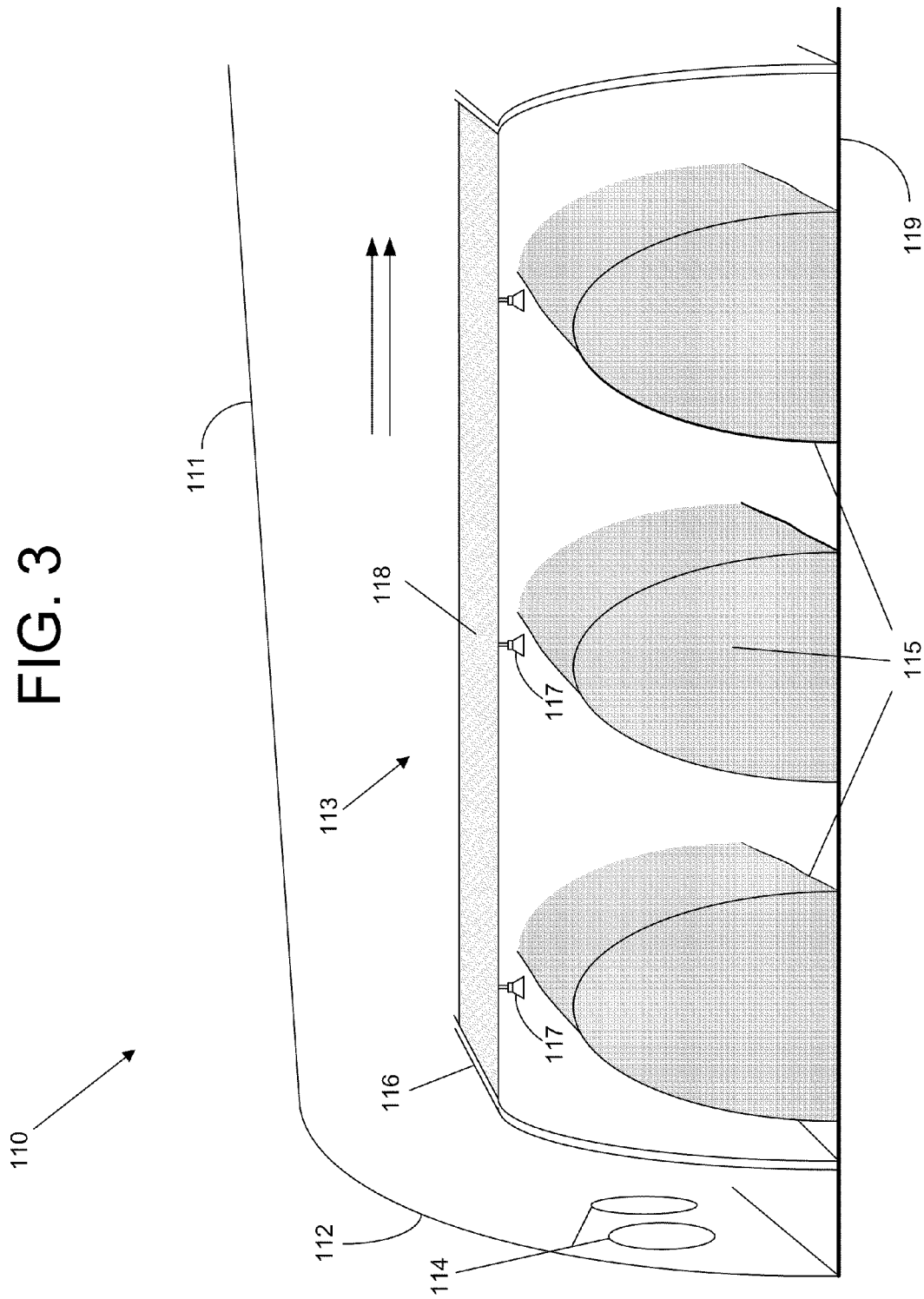
FIG. 3 shows a schematic, cross-sectional side view of an embodiment of the composting area of the collector region.

FIG. 1A shows a schematic cross-sectional view of a solar updraft tower 1 found in the prior art. A solar updraft tower 1 generally comprises a solar collector region 10 and a tower 50. The solar collector region 10 is a very large structure similar to a greenhouse in design and function that covers a vast area of land. Some designs have called for solar collector regions having a diameter of more than 7 km. The tower 50 is a hollow structure having great height (1000+ meters), and is centrally located relative to the solar collector region 10, such that the solar collector region 10 surrounds the tower 50. The tower 50 has an first open end 51, also known as a tower base, through which heated air generated in the collector region 10 enters and rises through the tower 50, and exits the tower 50 through the second open end 52.

The roof 11 of the solar collector region 10 may also increase in height as it meets the tower 50. The roof 11 of the solar collector region 10 is predominantly composed of a material such as glass and/or a transparent plastic that allows solar radiation to penetrate the interior of the solar collector region 10. The solar radiation heats the stone, gravel, water, air, and other matter within the solar collector region 10. This heat energy accumulates within the solar collector region 10 because the roof 11 helps prevent the heated air within the solar collector region 10 from mixing with the cooler, ambient air outside the solar collector region 10.

The heated air within the solar collector region 10, being lighter than the cold, ambient air outside, rises through the tower 50, creating significant wind speed near the base of the tower 50. Moreover, the difference in temperature between the air at the very top of the tower 50 and that within the solar collector region 10 facilitates this even further, creating an updraft through the tower 50 that increases wind speed through the system. An array of turbines 20 that generate electricity are then placed near the base of the tower 50 where the wind speed is great. The wind drives the turbines 20 and generates electricity. The area leading up to turbines 20 at the base of the tower 50 may also be constricted in such a manner as to create ports leading to the turbines 20 to increase wind speed at the turbines 20.

FIG. 1B shows a schematic top view of a solar updraft tower 1. The solar collector region 10 does not have to be circular as depicted but can rectangular, square, or any other shape, so long as it surrounds the tower 50. In the embodiment depicted in FIGS. 1A and 1B, the solar updraft tower 1 is substantially symmetrical where multiple turbines 20 (not shown) surround the base of the tower 50.

Compost Updraft Tower

Active composting takes place through the aerobic respiration process carried out by microorganisms, such as bacteria, yeasts and fungi, that break down organic matter including yard and food waste. This process generates considerable heat energy, and ultimately also results in humus as an end-product that can be used in a variety of agricultural settings.

FIG. 2 shows a schematic representation of a cross-sectional view of an embodiment of a novel compost updraft tower 100. The compost updraft tower 100 generally comprises a collector region 110 and a hollow tower 150. Within the composting area 113 of the collector region 110 are piles of compostable matter 115 that are mainly comprised of bio-degradable organic materials capable of being composted. Compostable matter 115 as labeled in the figures and referred to throughout this application may also contain some amount of non-compostable matter.

Under appropriate conditions, the piles of compostable matter 115 will undergo composting. To efficiently expedite the composting process, and thereby generate more heat, the piles should ideally contain organic material that has about a 30:1 ratio of carbon to nitrogen (C:N ratio). The piles must also be provided with sufficient amounts of oxygen and water to sustain the aerobic respiration performed by the microorganisms. Those of ordinary skill in the art will appreciate the various techniques available to aerate the piles of compostable matter 115; check the water content and C:N ratios through the use of sensors, and remedy any such deficiencies to assist in the composting process.

The heat energy generated by the piles of compostable matter 115 heats the air contained within the collector region 110. This heated air follows the convection currents and airflow shown by the double arrows in FIG. 2 toward the first open end 151 of the tower 150. Along the way the heated air flows past and drives the turbines 120 that generate electricity. Air constrictors 123 may be strategically placed or shaped to funnel and focus the airflow directly at the turbines 120 to increase efficiency. The air the flows up through the tower 150 and out the second open end 152 of the tower 150. The pressure differential caused by the height of the tower 150 assists in increasing wind speed through the compost updraft tower 100.

The larger the collector region 110 the more compostable matter 115 can be stored appropriately throughout the collector region 110, thereby generating more heat energy. The larger in height the tower 150, the greater the pressure and temperature differential will be between the hot air near the turbines 120 and the air outside the top of the tower 150. The greater this pressure and temperature differential the greater the wind speed will be at the turbines 120, driving the turbines 120 harder and generating more electrical energy.

FIG. 3 shows a schematic cross-sectional view of an embodiment of the composting area 113 of the collector region 110. Compostable matter 115 may be arranged in piles to undergo decomposition within the composting area 113 located within the collector region 115. Air vents 114 allow ambient air from outside to enter the collector region 110. A perimeter barrier 116 may be constructed to serve as a wall that protects the piles of compostable matter 115 from being disrupted by the incoming air from the air vents 114.

A compost covering 118 may be situated to cover the compostable matter 115 piles to prevent convection air currents that are flowing toward the interior of the collector region 110 from disrupting the compostable matter 115 piles. The compost covering 118 may also increase wind speed of the convection air currents by reducing drag. The compost covering 118 may be any suitable material that is permeable to the heat energy being released by the compostable matter 115, while also providing the compostable matter 115 piles adequate protection from high winds within the collector region 110. An example of such a material may be a mesh or porous fabric with fine holes. In other embodiments the compost covering 118 may be comprised of a rigid material with holes of suitable size to prevent debris from the compostable matter 115 to escape the composting area 113.

Water sprinklers 117 can also be installed from various locations near the compostable matter 115 piles to provide moisture to facilitate composting. The water sprinklers 117 can provide water via pipes that run parallel along the compost covering 118. In alternative embodiments the water sprinklers 117 can stem from pipes that run along the floor of the collector region 110. In yet alternative embodiments the water sprinklers 117 can be placed along the perimeter barrier 116 as shown in FIG. 3, and/or other barriers (not shown) between the piles of compostable matter 115.

Still referring to FIG. 3, in the preferred embodiment of the compost updraft tower 3100, the roof 111 of the collector region 110 may be comprised of a sufficiently transparent material, such as glass or transparent plastic, that readily allows solar radiation to penetrate through the roof 111 and into the collector region 110. Any material known in the art of greenhouse construction may be used for the roof 111 so long as it sufficiently traps electromagnetic radiation from the sun and prevents the heated air within the collector region 110 from escaping and mixing with the ambient air outside. Examples of materials for the roof 111 include: multiwall sheets made of PMMA (Poly-methyl methacrylate or poly-methyl 2-methylpropenoate) such as Plexiglas®; sheets of a polycarbonates; or polyethylene films.

The solar radiation from the sun heats the air within the collector region 110 along with other materials or objects within the collector region 110 that are capable of absorbing solar radiation, such as rocks, gravel, tanks full of water, compost, etc. that eventually will re-radiate this heat energy warming the air within the collector region 110 further.

The roof 111 of the collector region 110 should be substantially sealed so as not to allow the heated air within the collector region 110 to escape and mix with the ambient air immediately outside the collector region 110. The roof 111 of the collector region 110 may also have a rising slope as it progresses from the outer perimeter wall 112 of the collector region 110 toward the tower 150. The rising slope may help facilitate proper air flow toward the turbines 120.

The floor 119 of the collector region 110, which includes the composting area 113 within, may be comprised of a concrete slab to help support weight of the compost updraft tower 100, and all compost, materials, and equipment within. The floor 119 of the collector region 110 may have a slight slope (not shown) in order to facilitate proper drainage of waste liquids that may otherwise accumulate in the collector region 110. Alternatively drain holes and drainage pipes (not shown) may be installed in the floor 119 to carry away such waste liquid.

The elements and structure shown in FIG. 2 and FIG. 3 represents a cross-sectional view of the collector region 110. Same or similar elements and structure repeat throughout the collector region 110. In embodiments where the collector region 110 is circular in shape then the similar elements and structure may repeat in a radial fashion. In embodiments where the collector region 110 is not circular, but rather is comprised of some other shape such as rectangle, square, ellipse, or even an asymmetrical structure, then the similar elements and structure (e.g., air vents 114, perimeter barrier 116, compostable matter 115 piles, water sprinklers 117, compost covering 118, sensors (not shown), etc.) can be repeated throughout the area of the collector region 110. Moreover, the number of compostable matter 115 piles shown in FIG. 2 and FIG. 3 are merely exemplary; the actual number may be one or any number greater than one. There may be hundreds, thousands, and even tens of thousands of compostable matter 115 piles located throughout the composting area 113 of the collector region 110. The composting area 113 may extend from the outer perimeter wall 112 of the collector region 110 to the outer perimeter of the turbine area 122. However, in some embodiments where the turbines 120 are located within the interior body 153 of the tower 150, the composting area 113 may encompass the entire area bounded from one outer perimeter wall 112 of the collector region 110 to the farthest perimeter wall of the collector region 110 opposite that of the outer perimeter wall 112.

A compost updraft tower 100 of the size and magnitude described in this application would require hauling in tons of compostable matter 115, as well as hauling out tons of composted matter. In one embodiment, the compostable matter 115 can be brought into the composting area 113 manually. That is, the compostable matter 115 can be brought in via trucks, carts, or other vehicles driven or operated by humans by a non-automated process. The vehicles may enter the collector region 110 through an appropriate sized opening or doorway (not shown) in the perimeter of the collector region 110, and distribute the compostable matter 115 to its designated area. Conversely such vehicles can be used to remove the composted matter once it has sufficiently been composted.

Figure 4:
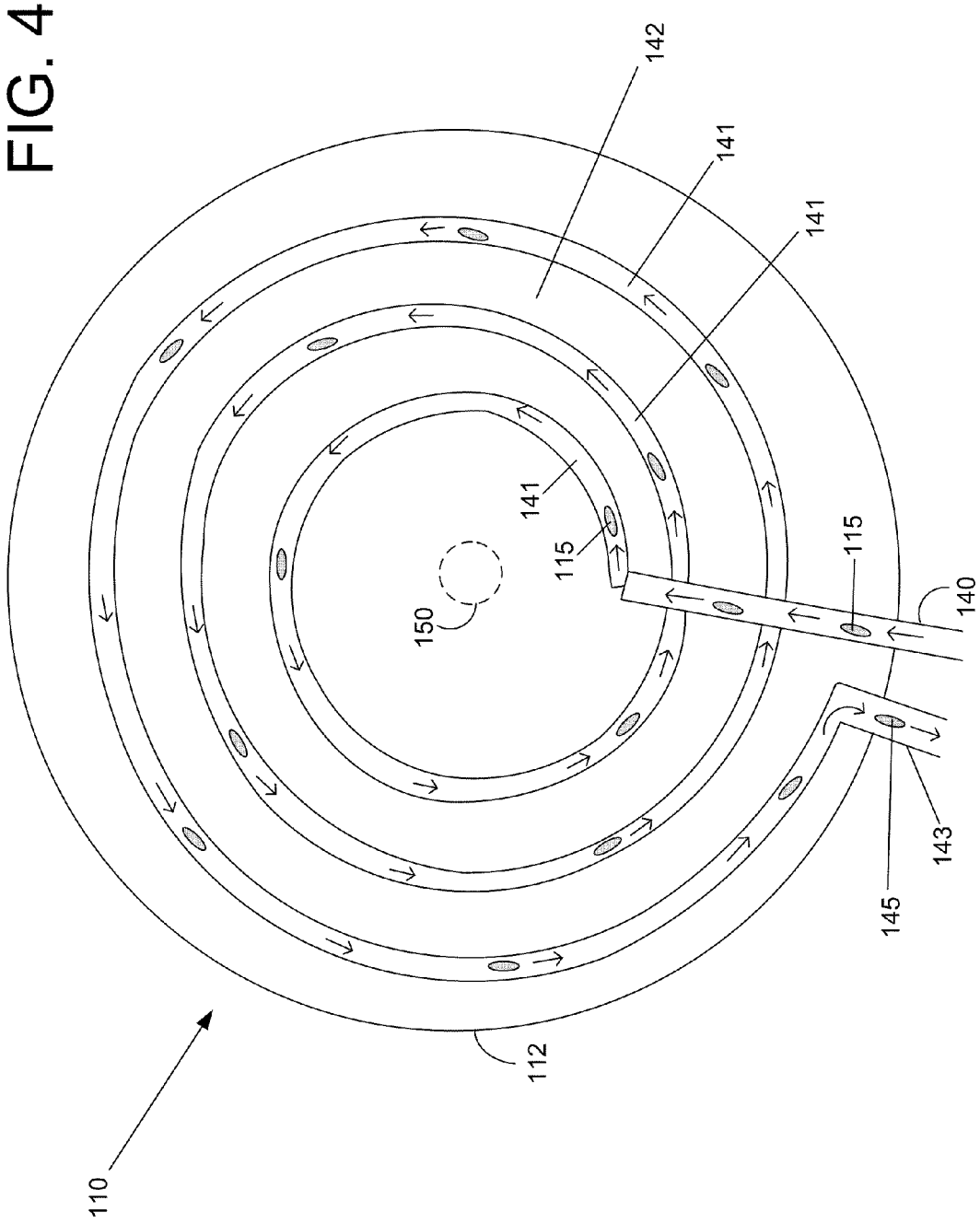
FIG. 4 shows a schematic, cross-sectional top view of one embodiment of a compost updraft tower system employing a conveyer belt system.

Alternatively, the compostable matter 115 can be brought into the collector region 110, or otherwise transported within the collector region 110, through an automated system. In one embodiment, the compostable matter 115 enters and exits the collector region 110 through a conveyer belt system. FIG. 4 shows a schematic, cross-sectional, top view of one embodiment of such a compost updraft tower 100 system employing a conveyer belt system. Compostable matter 115 first enters into the collector region 110 through the inbound conveyer belt 140, and follows the direction indicated by the arrows in FIG. 4. The outer perimeter wall 112 has a sufficient opening (not shown) to allow the inbound conveyer belt 140 and the compostable matter 115 carried by it to enter the collector region 110. The inbound conveyer belt 140 enters the collector region 110 at a height great enough so as to not interfere with the main conveyer belt 141 below it. The inbound conveyer belt 140 may have a cover (not shown) so that compostable matter 115 carried by it is not blown around or disrupted by wind within the collector region 110.

The inbound conveyer belt 140 transports the compostable matter 115 until it reaches the main conveyer belt 141. At that juncture the compostable matter 115 may simply fall off the end of the inbound conveyer belt 140 onto the main conveyer belt 141 creating piles of the compostable matter 115 on the main conveyer belt 141. The compostable matter 115 then begins its long journey around the collector region 110 atop the main conveyer belt 141, as the main conveyer belt 141 rotates/follows the counterclockwise, spiral direction indicated by the arrows in FIG. 4. The pace of the main conveyer belt 141 can be set so that the compostable matter 115 has sufficient time to undergo the desired level of composting, thereby releasing heat energy, by the time it reaches the outbound conveyer belt 143. Having undergone the desired level of composting, the compostable matter 115 is now designated as composted matter 145.

Figure 5:
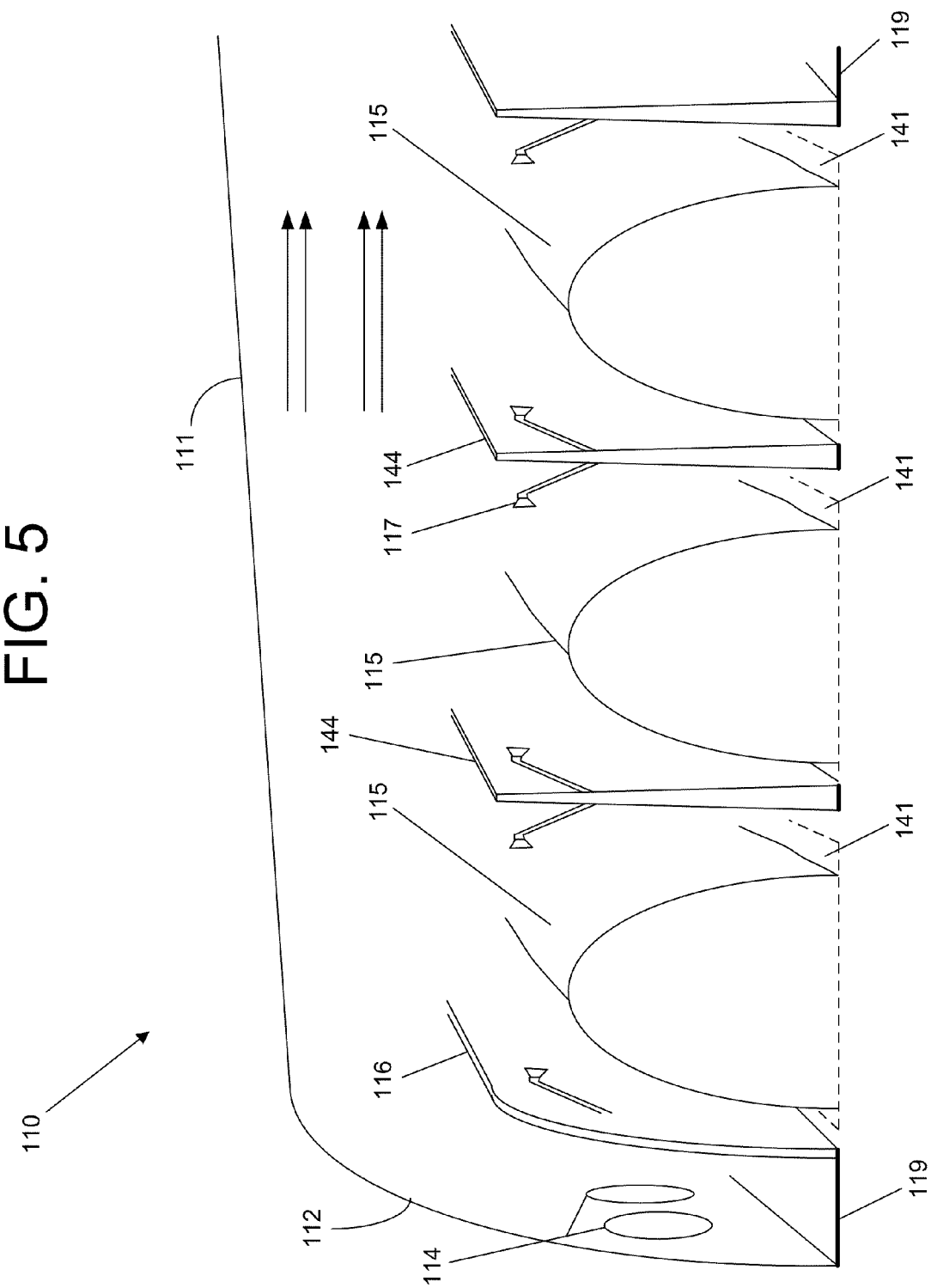
FIG. 5 shows a schematic, cross-sectional side view of an embodiment of the composting area of the collector region of a compost updraft tower utilizing the spiral conveyer belt system depicted in FIG. 4.

As an example, the pace of main conveyer belt 141 can be set at a speed such that it takes 4 weeks for the compostable matter 115 to make its revolutions around the collector region 110, and exit the collector region 110 via the outbound conveyer belt 143. However, the pace may be shortened or lengthened by days, week, or even months depending on the desired degree of composting to be achieved and the type and makeup of the compostable matter 115. For illustrative purposes only, the main conveyer belt spacing 142 (the space between the successive rings of the main conveyer belt 141 spiral) has been enlarged to better illustrate the components of the conveyer belt system. In practice this spacing 142 may consist of only a separating wall 144 as illustrated in FIG. 5. Furthermore, the number of spiral rings of the main conveyer belt 141 are merely illustrative, and in practice there may be many more. In yet other embodiments the main conveyer belt 141 does not follow a circular, spiral pattern around the collector region 110, but instead may proceed in other directions.

In some embodiments, the composted matter 145 removed from the compost updraft tower 100 may substantially be comprised of humus. Humus is a fiber-rich, carbon-containing product with inorganic nutrients like nitrogen, phosphorus and potassium that can be used as fertilizer, potting soil, or for other important agricultural purposes. Pure humus cannot be further composted, and therefore if the composted matter 145 has reached such a state it may be removed from the compost updraft tower 100 since it cannot release any more heat energy. The humus that is generated by the compost updraft tower 100 can be sold for a profit, or disbursed onto nearby land to facilitate plant growth. In other embodiments, the composted matter 145 has not fully composted, but may still be removed from the compost updraft tower 100 for efficiency reasons. In such a case, the compostable matter 145 can be taken to another facility to undergo additional composting.

FIG. 5 shows a schematic, cross-sectional side view of an embodiment of the composting area 113 of the collector region 110 of a compost updraft tower utilizing the conveyer belt system depicted in FIG. 4. As shown in FIG. 5, the compostable matter 115 resides atop the main conveyer belts 141 as it makes its journey around the collector region 110 while undergoing composting. Separating walls 144 of varying thickness and height may be used to isolate the paths of the main conveyer belt 141 from one another. The separating walls 144 are preferably stationary while the main conveyer belt 141 proceeds forward between them. A composting cover (not shown), similar to the one depicted in FIG. 3, may also be used with the embodiment illustrated in FIG. 5 to prevent disruption of the compostable matter 115 from winds within the collector region 110. Sprinklers 117 attached to the separating walls 114 may also help keep the compost moist if necessary; alternatively the sprinklers 117 can be placed in the same way as shown in FIG. 3. Sensors (not shown) may be placed along the separating walls 144 to monitor the composting process of the compostable matter 115 moving by.

Figure 6:
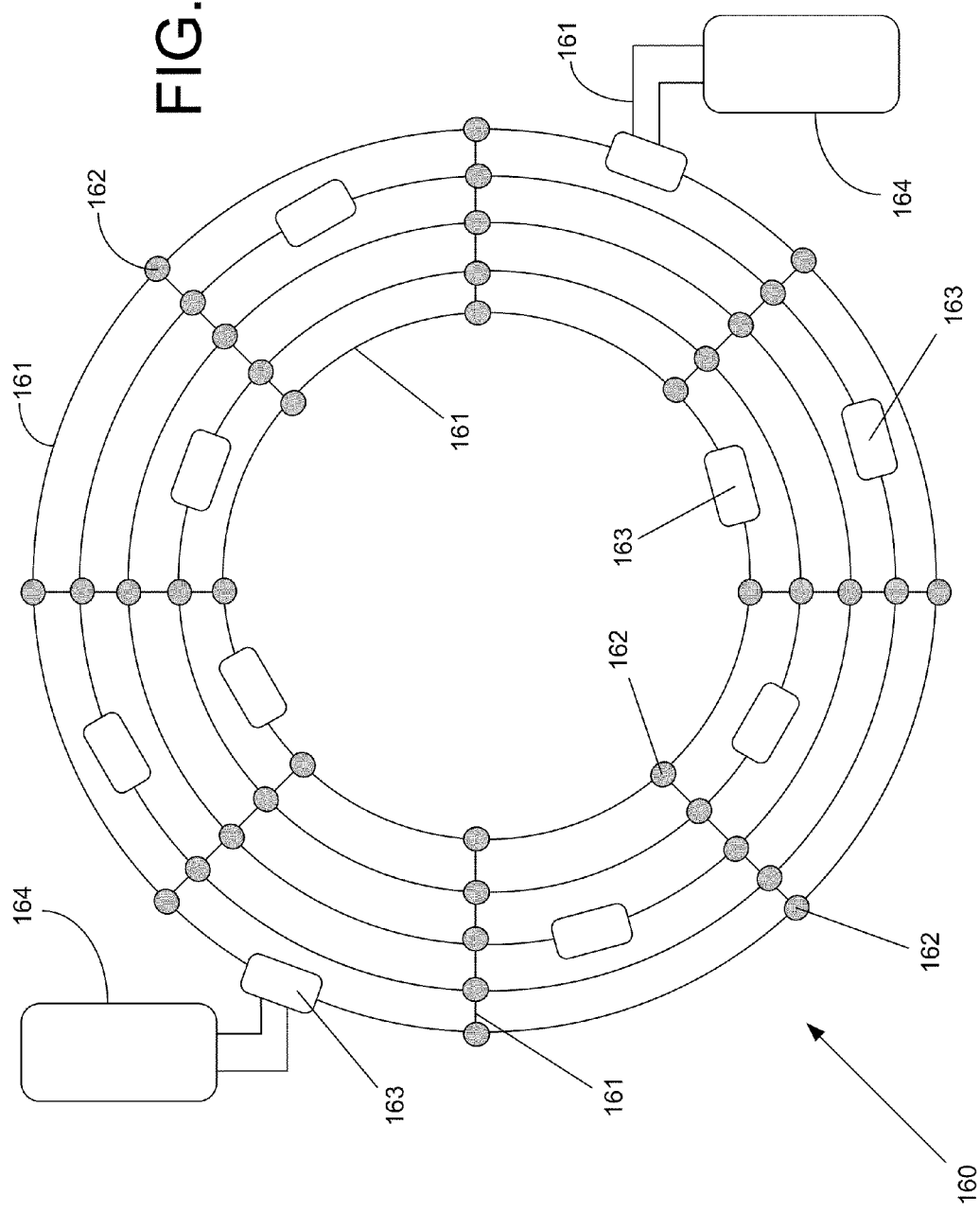
FIG. 6 shows a schematic of an embodiment of a heated pipe assembly.

In certain conditions, it may be desirable to provide heat to the compostable matter 115 within the collector region 110, or the collector region 110 as a whole, to assist in the composting process. For example, colder climates or seasonal changes may mandate that heat be provided to the compostable matter 115 to facilitate active composting. FIG. 6 shows a schematic view of an embodiment of a heated pipe assembly 160 that can be used in conjunction with any of the compost updraft tower 100 embodiments described herein. Certain elements of the heated pipe assembly 160, which will be described in detail below, can be embedded underneath the floor 119 of the collector region 110 to provide heat to the compostable matter 115 above.

Referring to FIG. 6, the heated pipe assembly 160 comprises: pipes 161, valves 162, circulating pumps 163, and liquid tanks 164. Although only a few of the pipes 161 are labeled in FIG. 6 to keep the drawing clear, the pipes 161 comprise the black lines shown in FIG. 6 (excluding the element number lead lines, and unless otherwise labeled). The pipes 161 may be composed of galvanized steel, iron, copper, or any other suitable material for carrying liquid. The pipes 161 carry a liquid such as water, oil, or any other liquid with a relatively high capacity to retain heat, and are interconnected with one another through a series of valves 162 and circulating pumps 163. The circulating pumps 163 drive the flow of liquid through the pipes 161. The valves 162 can be manually or automatically (through the use computer systems) opened or closed to control the flow of liquid through pipes 161 located in certain sectors of the heated pipe assembly 160. In this fashion heat may be provided to select sectors of the composting area 113 that contain compostable matter 115. Liquid tanks 164 are also connected to the heated pipe assembly 160 to house excess liquid and provide liquid to the pipes 161 if needed.

In one embodiment, portions of the pipes 161 are wrapped in electrically operated heating coils or heating blankets (not shown) that heats the liquid within the pipes 161. In yet another embodiment, the pipes 161 are not wrapped with a heating element, but instead the liquid tanks 164 provide heated liquid to the pipes 161 throughout the heated pipe assembly 160. The electrical power required to drive the heating coils, blankets, or to heat the liquid tanks 164 can be derived from solar panels (not shown) located just outside the compost updraft tower 100. Alternatively the solar panels may be mounted alongside the tower 150 or on the roof 111 of the collector region 110. Also, the number and location of pipes 161, valves 162, circulating pumps 163, and liquid tanks 164 shown in FIG. 6 are merely illustrative; a myriad of possible configurations of these elements may be used to depending on the structure, shape, and design of the compost updraft tower 100 for which the heated pipe assembly 160 is designed for.

Figure 7:
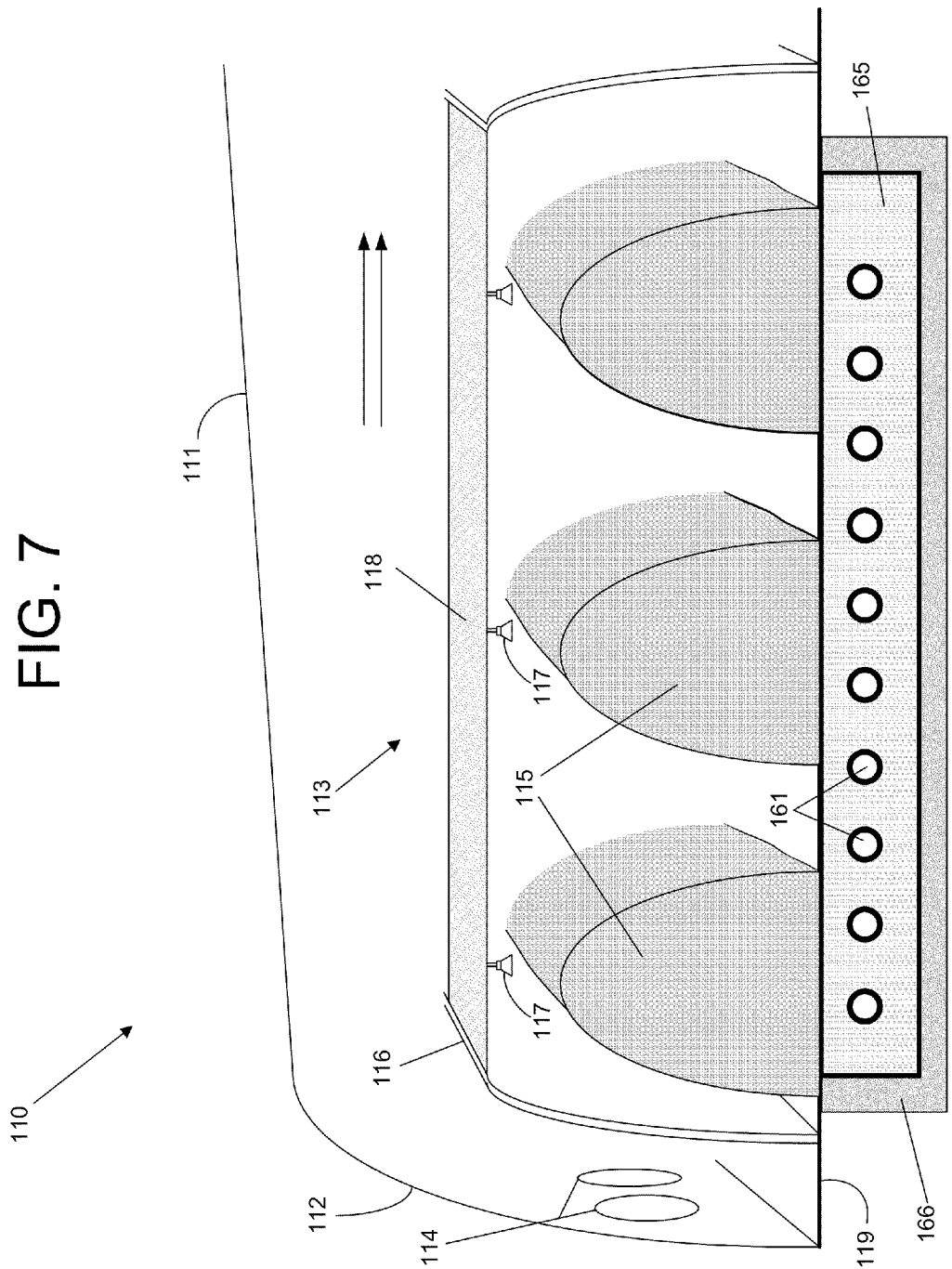
FIG. 7 shows a schematic, cross-sectional side view of an embodiment of a compost updraft tower utilizing an embodiment of a heated pipe assembly.

FIG. 7 shows a schematic, cross-sectional side view of an embodiment of a compost updraft tower 100 utilizing an embodiment of the heated pipe assembly 160 located within the concrete slab 165 underneath the floor 119 of the composting area 113. Although the pipes 161 themselves may be located within the concrete slab 165, other elements of the heated pipe assembly 160 may be located above ground, both inside or outside the collector region 110. These elements include the valves 162, circulating pumps 163, and liquid tanks 164. An insulating material 166 may also be laid down underneath and along the sides of the concrete slab 165 to prevent heat from dissipating into the ground. The heated pipe assembly 160 described herein is merely one embodiment; other systems can be devised to provide heat to the area within the collector region 110.

Turbines

Figure 8:
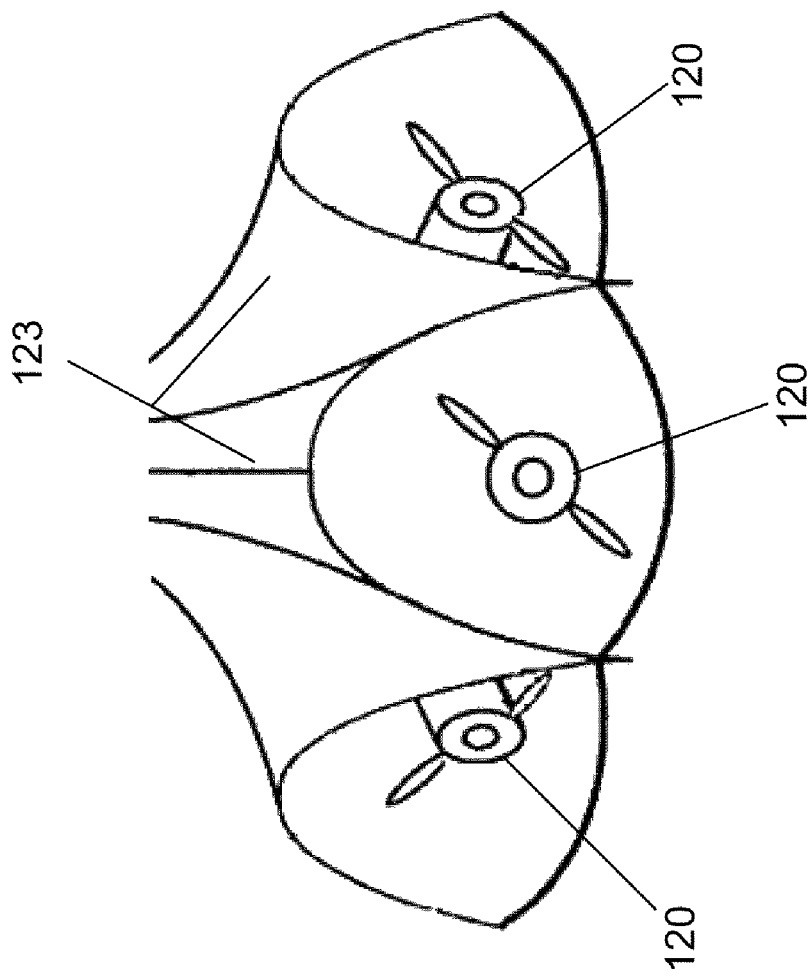
FIG. 8 shows schematic view of an embodiment of a portion of an array of turbines featuring a ported structure.

Referring back to FIG. 2, a schematic cross-sectional side view of a compost updraft tower 100 is shown. An array of turbines 120 surround (not shown) the base of the tower 150 and generate electricity. The volume of air leading up to the turbines 120 is forced to pass through a constricted area through the use of air constrictors 123 that increase wind speed that drive the turbines 120. As shown in FIG. 8, the air constrictors 123 can be designed in such a way so as to create ports leading up to each turbine 120 that surrounds the base of the tower 150.

Referring to FIG. 9, in one embodiment the turbines 120 near the base of the tower 150 may be raised closer to the roof 111 via a turbine platform 125. Other variations of turbines may implemented as well. Referring to FIGS. 10A and 10B, the turbines 120 within the compost updraft tower 100 may be comprised of paddlewheel style turbines 220 that rotate in the direction shown by the arrows around an axis 222. The blade or fins 221 of the turbine 220 may be straight extending out radially, or curved as shown in the cross-sectional view of FIG. 10B.

In yet other embodiments, one or more turbines may be situated within the interior body 153 of the tower 150. The airflow that rises up through the interior body 153 of the tower on its way to the second open end 152 of the tower drives the turbines. Such turbines may replace the turbines 120 shown in FIG. 2 located near the base of the tower 150, or may be utilized in addition to turbines 120 shown in FIG. 2. In yet other embodiments, the blades of the turbines located within the interior body 153 can be extended along the length of the tower 150 thereby resembling a spiral staircase formation (not shown).

Other Additional Embodiments

FIG. 11 shows a schematic side view of an embodiment of a compost updraft tower system 200 featuring a multi-tower structure. The collector regions 210 house the turbines, compostable matter, and includes the elements and features shown in FIG. 2 through FIG. 7. Solar panels 255 may also be installed on the outer surface of the collector regions 210 to generate additional electricity. The number of towers 250 shown in FIG. 11 are merely illustrative, and in practice any number of towers 250 and corresponding collector regions 210 may be used. The collector regions 210 shown in FIG. 11 may be separated internally from one another with walls or may also be open to allow air to flow between the collector regions 210.

Figure 12A:
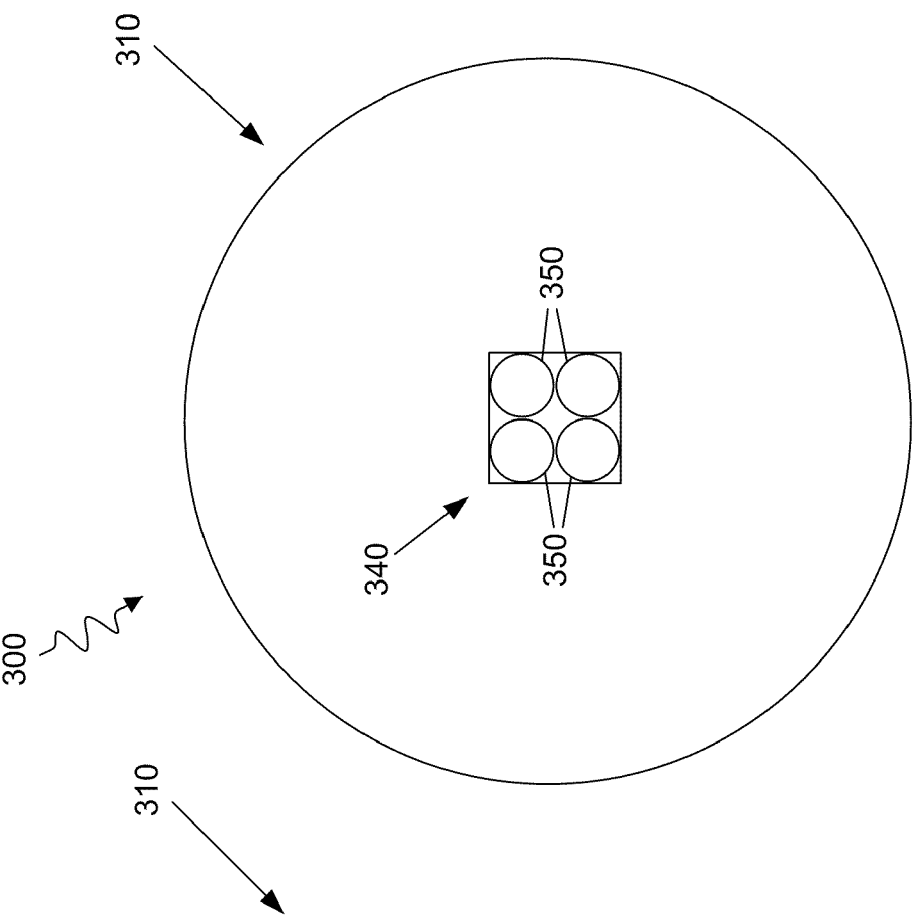
FIG. 12A and FIG. 12B show schematic top views of yet additional embodiments of a compost updraft tower system.
Figure 12B:
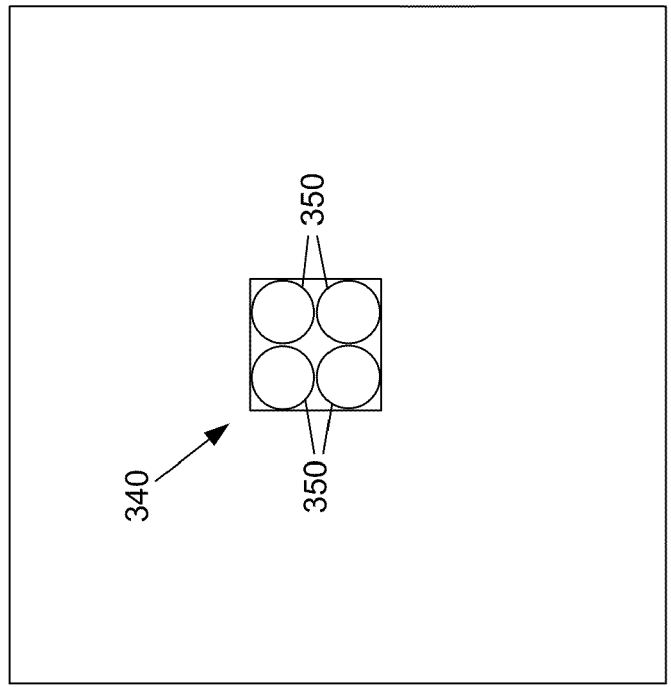

FIG. 12A and FIG. 12B show a schematic top view of yet additional embodiments of a compost updraft tower system 300. The compost updraft tower system 300 of FIG. 12A has a rectangular shaped collector region 310, whereas the compost updraft tower system 300 of FIG. 12B has a circular shaped collector region 310. All other aspects of the two systems are the same, and the contents and functionality of the collector regions 310 are the same as those shown in FIG. 2 through FIG. 7 and as described in the written description above. However, the compost updraft tower systems 300 of FIG. 12A and FIG. 12B feature a multi-tower design. The tower hub 340 houses multiple towers 350. The towers 350 function in the same way the towers 150 disclosed in FIG. 2 through FIG. 7 do and as described in the written description above.

With respect to the various embodiments described herein, it is anticipated that the composting process taking place within the compost updraft towers will be monitored by sensors, engineers, or both, to make sure the compostable matter is adequately decomposing. If the C:N ratio of a compost pile is either too low or too high, various means in the art of composting can be utilized to correct such a deficiency. For example, if the C:N ratio is too low then carbon rich matter can be added to the compostable matter, such as, dry leaves, cereal straw, sawdust, or wood. If the C:N ratio is too high then "green waste" can be added that is nitrogen rich, such as, manure, food waste, grass clippings, etc. Also, different techniques in the art of composting can be utilized to aerate the piles of compostable matter within the compost updraft tower. This may include employing mechanical means to mix the compostable matter around during the composting process.

With respect to the various embodiments described herein, the compostable matter may be run through an industrial strength shredder before it enters the collector region of a compost updraft tower. Smaller pieces of compostable matter undergo composting more rapidly than larger pieces, and are easier to handle. Once the compostable matter has turned into composted matter, it can further be processed as it is removed from the compost updraft tower. This includes, among other things, further sorting, packaging, straining, and shredding. The composted matter may also be sent to another processing facility where it is further composted into pure humus, and extraneous noncompostable material is removed.

With respect to the various embodiments described herein, the compostable matter may be pre-sorted prior to entering the compost updraft tower or prior to shredding so as to remove recyclable material that cannot be composted. The recyclable material can be sent to a recycling facility to further reduce consumption of natural resources.

With respect to the various embodiments described herein, the dimensions of the tower and collector region of an updraft compost tower will vary depending on the specific design constraints and requirements of a given plan. In general, however, it is anticipated that collector regions of a compost updraft tower can be hundreds, thousands, or even tens of thousands of meters long in diameter. Similarly, the tower portion of a compost updraft tower can also be hundreds and even thousands of meters in height.

In other embodiments, the compostable matter 115 located within the composting area 113 in FIG. 2, FIG. 3, and FIG. 7, may be contained in wells or ditches (not shown) that are below floor 119 level. In such an embodiment an outer perimeter barrier 116 may not be necessary because the compostable matter 115 will no longer be in the direct oncoming path of air flowing into the collector region 110 through air vents 114. The wells or ditches housing the compostable matter 115 may also be covered using similar composting covers 118 described herein to prevent disruption by wind in the collector region 110. In yet other embodiments, a similar well/ditch design can be used in conjunction with an automated conveyer belt system for hauling in and hauling out compostable matter and composted matter, respectively. Such a conveyer belt system may be similar to the one described herein with respect to FIG. 4 and FIG. 5, or any other suitable conveyer belt system design.

Advantages of the embodiments of the compost updraft tower systems and methods disclosed herein utilize the heat energy released during the composting process to produce electricity using an updraft tower. Furthermore, such systems may utilize the heat energy released during the composting process to supplement the solar heat energy generated within the collector region of a solar updraft tower to increase output power of the entire system. Moreover the compost updraft towers described herein accomplishes these tasks while reducing landfill pollution by converting compostable matter into a valuable and useful end product such as humus that can be used in agriculture. In addition, such systems produce electricity in a clean and bio-friendly manner.

The foregoing description of the embodiments of the invention have been presented for purposes of illustration and description. It is not intended to be exhaustive or to limit the invention to the precise form disclosed, and many modifications and variations are possible in light of the above teaching. All views labeled as "schematic" in the present application are not drawn to scale or otherwise meant to show detailed designs of the embodiments depicted; they are merely intended to illustrate general function of the embodiments they depict. The embodiments were chosen and described in order to best explain the principles of the invention and its practical application to thereby enable others skilled in the art to best utilize the invention in various embodiments and with various modifications as are suited to the particular use contemplated. Thus, the present invention is not intended to be limited to the embodiments shown herein but is to be accorded the widest scope consistent with the principles and novel features disclosed herein.

The invention claimed is:

1. A system that utilizes solar radiation for generating electricity comprising:
   a collector region comprising:
      a transparent roof permeable to the solar radiation, the solar radiation heating air within the collector region;
      a composting area configured to receive and compost compostable matter, the composting of the compostable matter further heating air within the collector region;
      wherein the collector region is operative to allow an airflow generated from the heated air to move through the collector region;
   a hollow tower rising up from the collector region, the tower having a first open end and a second open end, wherein the airflow moving through the collector region flows from a perimeter of the collector region to the first open end of the tower, and then rises through the tower to the second open end of the tower; and
   one or more turbines positioned in a path of the moving airflow to generate electricity.

2. The system of claim 1 wherein the composting area comprises sensors that monitor the composting of the compostable matter.

3. The system of claim 1 further comprising a heated pipe assembly.

4. The system of claim 1 wherein the collector region comprises a conveyer belt system that transports the compostable matter.

5. The system of claim 1 wherein the composting area comprises a plurality of water sprinklers, a perimeter barrier, and a compost covering.

6. The system of claim 1 wherein the collector region comprises air constrictors that focus the airflow at the one or more turbines.

7. The system of claim 1 wherein the hollow tower comprises a plurality of hollow towers each rising up from the collector region, each of the plurality of towers having a first open end and a second open end.

8. The system of claim 6 wherein the air constrictors form a port for each of the one or more turbines.

9. The system of claim 1 wherein the one or more turbines comprise a plurality of turbines that surround the first open end of the tower.

10. The system of claim 1 wherein the one or more turbines are located within an interior body of the tower.

11. A method for generating electricity comprising:
   composting compostable matter within a collector region to release heat energy from the compostable matter and generate an airflow within the collector region;
   creating an air pressure differential between air within the collector region and ambient air located outside the collector region with a hollow tower rising up from the collector region, the tower having a first open end and a second open end, wherein the airflow moving through the collector region flows from a perimeter of the collector region to the first open end of the tower, and then rises through the tower to the second open end of the tower; and
   generating electricity through one or more turbines positioned in a path of the moving airflow.

12. The method of claim 11 wherein the collector region has a transparent roof permeable to solar radiation.

13. The method of claim 11 further comprising heating the compostable matter within the collector region with a heated pipe assembly.

14. The method of claim 11 wherein the collector region comprises a conveyer belt system that transports the compostable matter.

15. An apparatus comprising:
   means for composting compostable matter within a collector region to release heat energy from the compostable matter and generate an airflow within the collector region;
   means for creating an air pressure differential between air within the collector region and ambient air located outside the collector region with a hollow tower rising up from the collector region, the tower having a first open end and a second open end, wherein the airflow moving through the collector region flows from a perimeter of the collector region to the first open end of the tower, and then rises through the tower to the second open end of the tower; and
   means for generating electricity from the airflow.

16. The apparatus of claim 15 wherein the collector region has a transparent roof permeable to solar radiation.

17. The apparatus of claim 15 further comprising a means for heating the compostable matter within the collector region.

18. The apparatus of claim 17 wherein the means for heating the compostable matter within the collector region comprises a heated pipe assembly.

19. The apparatus of claim 15 wherein the collector region comprises a means for automatically transporting the compostable matter within the collector region.

20. The apparatus of claim 19 wherein the means for automatically transporting the compostable matter within the collector region comprises a conveyer belt system.

\* \* \* \* \*